March 23, 1926.
E. PETTY
1,577,852
PROCESS OF SEPARATING WAX FROM LUBRICATING OIL
Filed August 24, 1921
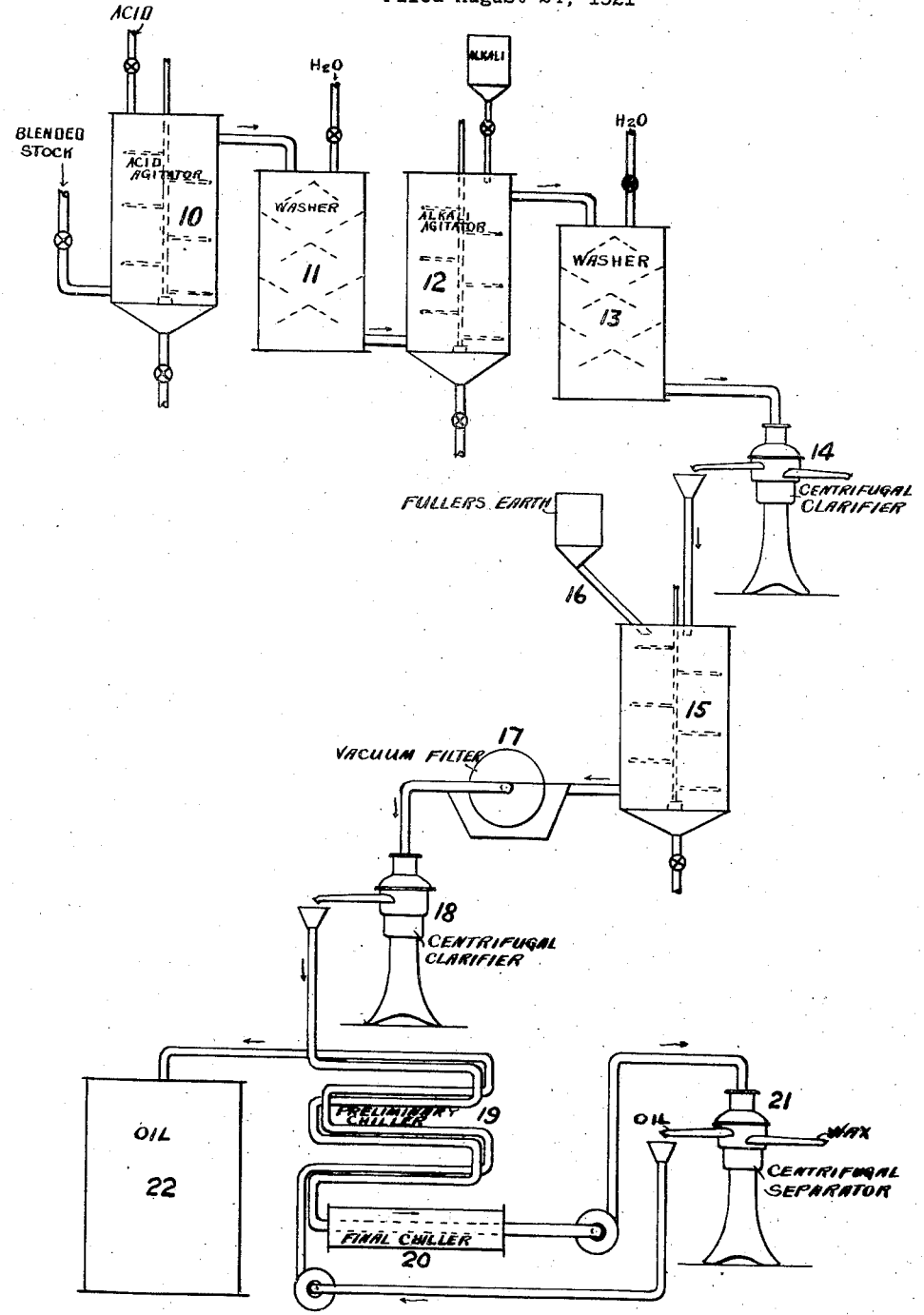
WITNESS:
INVENTOR
Earl Petty
BY
ATTORNEY.

Patented Mar. 23, 1926.

1,577,852

UNITED STATES PATENT OFFICE.

EARL PETTY, OF WINFIELD, KANSAS, ASSIGNOR TO THE DE LAVAL SEPARATOR COMPANY, OF NEW YORK, N. Y., A CORPORATION OF NEW JERSEY.

PROCESS OF SEPARATING WAX FROM LUBRICATING OIL.

Application filed August 24, 1921. Serial No. 495,078.

*To all whom it may concern:*

Be it known that I, EARL PETTY, a citizen of the United States, residing at Winfield, county of Cowley, and State of Kansas, have invented a new and useful Improvement in Processes of Separating Wax from Lubricating Oil, of which the following is a full, clear, and exact description, reference being had to the accompanying drawings, which form a part of this specification.

In the refining of light crude oil, it is customary to distill off successively products of successively higher boiling points, such as naphtha, illuminating oil, gas oil and wax distillates, leaving as a residue what is commonly known as cylinder stock. This cylinder stock contains a substantial proportion of amorphous wax (petrolatum) which it is necessary or desirable to separate, each product constituting a more valuable product when separated from the other. My process is intended and adapted to effect this separation. It is also applicable to the treatment of any lubricating stock containing petrolatum or amorphous wax.

It is known to effect this separation by treating cylinder stock with sulphuric acid, withdrawing the acid sludge, treating the stock with alkali, withdrawing the alkaline precipitate, adding to the stock a light petroleum product such as naphtha, refrigerating the blended stock to throw the wax out of solution, separating the wax from the oil by filtration or settlement, and distilling off the naphtha. It is also known, in a later process, to subject the blended stock to a centrifugal process, the same comprising the addition of a heavy liquid, such as refrigerated brine, and the subjection of the brine, wax and oil to centrifugal force whereby the brine acts to carry the wax out of the heavy liquid outlet of the centrifugal bowl while the oil escapes from the light liquid outlet.

The older processes are open to serious objections. They are bulk processes, involving the use of expensive plants occupying much room, the handling of a large amount of stock at one time and the expenditure of considerable time, and moreover they do not effect a thorough separation of the constituents. The later centrifugal process affords a good method of recovering wax-free oil, but at the expense of the production of a mixture of brine and wax whose separation involves an additional elaborate and expensive treatment and which can be separated only with great difficulty.

My process utilizes knowledge derived from known processes, but the method of applying certain of the known treatments is substantially modified, while certain new steps are introduced, such as the separation of the wax from the oil by centrifugal means and without the use of a cushioning or carrying liquid, such separation being rendered entirely practicable by the modified preceding steps. My process involves a continuous, as distinguished from a batch treatment, and the handling at any one time of a relatively small amount of stock, and effects the purification of and separation expeditiously, dispenses with the necessity of a large and expensive plant, and secures a thorough separation of refined oil-free wax from refined and bright wax-free cylinder oil.

An understanding of the preferred mode of carrying out the process may be readily had by the following description in connection with a diagram of a workable apparatus, such diagram being shown in the drawing.

It will be understood that the elements of the apparatus are all individually old and that no claim is made herein even to any new order or arrangement of such apparatus, it being understood that my new process is not dependent for its execution upon any particular apparatus.

In preparation for my process I distill off from the crude petroleum the various distillates, leaving as a residue cylinder stock or other lubricating stock containing petrolatum wax. To this stock is added a light petroleum product, preferably naphtha, in the proportion of about three parts of naphtha to two parts of cylinder stock. A typical composition is sixty per cent of a 56°–58° Bé. naphtha and forty per cent of a 25°–26° Bé. cylinder stock, resulting in a diluted stock of 42° Bé. The blended stock is then run into a continuous agitator 10, to which is continuously added sulphuric acid. From this agitator the precipitated acid sludge, containing tarry and asphaltic materials, is drawn off either continuously or at intervals, the stock overflowing into another tank 11, wherein it is washed with water. The acid-treated and washed stock is then conveyed to another tank 12, wherein it is subjected to treatment with an alkali, such as caustic soda, to neutralize the acid. It is then run through a tank 13, wherein it is washed with water. Instead of applying the alkali treatment in the tank 12, the stock, as well as the caustic soda solution, may be run or pumped through a pack of excelsior, as more fully described in an application filed by me August 24, 1921, Serial No. 495,080.

The stock now comprises an emulsion of oil stock and an alkaline solution. The emulsion is fed into a De Laval centrifugal separator 14 and the soap and alkaline water separated from the oil stock, which is now practically free of tar and asphalt but contains objectionable coloring matters.

The stock is then run continuously into a mixer 15, into which is continuously fed, from a container 16, from two to ten per cent of fuller's earth. The thoroughly mixed product is continuously fed from the mixer 15 into a preliminary clarifier 17, which may be a vacuum filter of any known efficient type, or a basket centrifuge. This preliminary clarification removes the heavier particles of coloring matter and fuller's earth. The filtered and partially clarified product is then fed into a centrifugal clarifier 18, which removes the lighter particles of coloring matter. The product is now practically free of objectionable coloring matter, as well as tarry and asphaltic material; but the cylinder oil, naphtha and petrolatum are still in solution.

From the centrifugal clarifier 18 the solution of oil and wax is conveyed through a double pipe chiller 19 in heat exchange relation with chilled oil that has been separated as hereinafter described and wherein its temperature is materially reduced, and thence through a refrigerating tank, or coil 20 in heat exchange relation with a refrigerating liquid, such as refrigerated brine, thereby reducing the temperature to the degree required to throw all the petrolatum out of solution. The maximum permissible final temperature will vary with the proportion of naphtha that has been added to the original distillate. 10° F. is about the maximum permissible temperature, while —10° F. is about as low as economical considerations permit. A temperature of zero F. is a recommended temperature with naphtha added in the proportion of sixty per cent.

The chilled oil and precipitated wax are then continuously transferred to a De Laval centrifugal separator 21, wherein the oil is separated from the wax. It has been heretofore assumed that it is impossible, in a centrifugal separator, to separate oil and solidified wax and at the same time effect a continuous outflow of the wax. Resort, therefor, has been had, as hereinbefore stated, to the introduction of a liquid heavier than the wax, such as brine. to act as a cushion to receive the wax thrown toward the periphery of the bowl and carry it out of the bowl. This process is effective to facilitate the outflow of the wax, but it necessarily involves a subsequent treatment for the separation of the wax and brine. Inasmuch as their separation is difficult, and even if possible would involve additional and expensive steps, it is highly desirable to avoid the use of such cushioning or carrying liquid. I have found it entirely feasible, if the stock be subjected to the preceding treatments herein described, to effect not only a thorough separation of the refrigerated constituents by centrifugation but a free and continuous outflow of the separated wax, it being understood that the wax is not a solid in the sense of possessing no fluidity. It is true that satisfactory separation and separate discharge of the two constituents could not probably be effected in every high speed centrifugal separator. Thus an ordinary centrifugal cream separator would be probably unsatisfactory. I have demonstrated, however, that a De Laval separator, of essentially the type set forth in the Snyder Patent, No. 1,283,343, dated October 29, 1918, will function efficiently. It will be understood, however, that other centrifugal separators may be found not only operative, but satisfactory, and that the process is not limited to the use of a centrifugal separator of any particular construction; mention being made of the specific type of separator to enable those skilled in the art to practice the process without the necessity for experimenting with different types of separators in order to obtain the best results.

It is true that the disposal of the continuously discharging wax may present some difficulties without special attention to the sludge covers to carry the wax from the bowl, in that there is a tendency of the wax, which is by no means as free flowing as the oil, to clog the discharge spouts of the receiving pans; but this difficulty, even if not remedied, does not render the separating process impracticable. However, this objection has been entirely overcome by the provision of steam jackets applied to the receiving pan or its spouts, or both, against which the wax impinges upon its discharge from the separator bowl and which serve to so far increase the temperature of the wax as to substantially increase its fluidity, facilitate its ready discharge from the spouts of the receiving pan and avoid clogging. This part of the process, however, is not per se my invention, it being set forth in an application Serial No. 495,134, filed August 24, 1921, by Cyrus Howard Hapgood.

The wax-free oil, as it flows away from the separator 21 through the double pipe chiller 19, to the recepacle 22, absorbs heat from the incoming mixture of wax and oil, as hereinbefore described.

Each of the separated constituents—the oil-free wax and the wax-free oil—is distilled to drive off and recover the naphtha.

Having now fully described my invention, what I claim and desire to protect by Letters Patent is:

1. The process of separating wax from mineral oil lubricating stock which comprises diluting the same with a light petroleum distillate, treating the diluted stock with acid, removing the acid sludge, treating the stock with an alkali, subjecting the resultant emulsion to centrifugal force and separately flowing off the stock, and then subjecting the stock to a decolorizing treatment and a separating treatment: the decolorizing treatment comprising intimately clarifying and mixing a decolorizing agent with the stock and subjecting the mixture to a preliminary treatment to remove the heavier part of said agent and coloring matter and to a centrifugal clarifying treatment to remove the lighter part of said agent and coloring matter; and the separating treatment comprising chilling the stock to a temperature sufficiently low to precipitate the wax and subjecting the resultant mixture to centrifugal force and separately flowing off the wax and the lubricating oil.

2. The continuous process of separating wax from mineral oil lubricating stock which comprises diluting the same with a light petroleum product, subjecting a flowing stream of the diluted stock to the following operations: agitating with acid and withdrawing acid sludge and flowing off the treated stock, agitating with alkali, subjecting the outflowing emulsion to centrifugal force and separately flowing off the stock, mixing a clarifying and decolorizing agent with the outflowing stock and agitating, subjecting the flowing mixture to a preliminary treatment to remove the heavier part of said agent and coloring matter and to a centrifugal clarifying treatment to remove the lighter part of said agent and coloring matter, refrigerating the outflowing stream of stock to precipitate the wax, and subjecting the flowing mixture of wax and oil to centrifugal force and separately flowing off the wax and the oil.

3. The process of separating wax from mineral oil lubricating stock which comprises treating the stock with acid, removing the acid sludge, treating the stock with an alkali, subjecting the resultant emulsion to centrifugal force and separately flowing off the stock, and then subjecting the stock to a decolorizing treatment and a separating treatment: the decolorizing treatment comprising intimately mixing a clarifying and decolorizing agent with the stock and subjecting the mixture to a preliminary treatment to remove the heavier part of said agent and coloring matter and to a centrifugal clarifying treatment to remove the lighter part of said agent and coloring matter; and the separating treatment comprising chilling the stock to a temperature sufficiently low to precipitate the wax and subjecting the resultant mixture to centrifugal force and separately flowing off the wax and the lubricating oil.

4. The process of separating wax from mineral oil lubricating stock which comprises diluting the stock with a light petroleum distillate, then agitating the diluted stock with an acid, separating out acid sludge and agitating the acid treated stock with an alkali, then removing the soap and water from the stock, then mixing a clarifying and decolorizing agent with the stock and removing said agent with coloring matter, then chilling the stock, and then centrifuging the stock to separate the wax, with a proportion of the diluting agent, from the remainder of the diluting agent and the oil.

5. The process of separating wax from mineral oil lubricating stock which comprises agitating the stock with an acid, separating out acid sludge and agitating the acid-treated stock with an alkali, establishing a flowing stream of the acid-treated and neutralized stock and subjecting such flowing stream to centrifugal force and separately flowing off the soap and water and the stock, establishing a flowing stream of the centrifuged stock and in the course of its flow mixing with the stock a clarifying and decolorizing agent and then removing said agent with coloring matter, then chilling the clarified and decolorized stock, and then centrifuging the stock to separate the wax from the oil.

In testimony of which invention, I have hereunto set my hand, at New York, on this 19th day of August, 1921.

EARL PETTY.